UNITED STATES PATENT OFFICE.

EDWIN W. GRAFTON, OF WASHINGTON, DISTRICT OF COLUMBIA.

PAINT.

SPECIFICATION forming part of Letters Patent No. 471,970, dated March 29, 1892.

Application filed November 16, 1891. Serial No. 412,048. (No specimens.) Patented in Canada November 10, 1891, No. 58,370.

*To all whom it may concern:*

Be it known that I, EDWIN W. GRAFTON, a citizen of the United States, and a resident of Washington, in the District of Columbia, have invented certain new and useful Improvements in Paint Compounds, (for which I have made application for a patent in Canada, filed November 10, 1891, No. 58,370;) and I do hereby declare that the following is a full, clear, and exact description of the invention, which will enable others skilled in the art to which it appertains to make and use the same.

My invention relates to an improved paint compound, which will be found to possess superior qualities to other compositions of this nature or character.

The invention consists in a paint compound composed of the following ingredients and in about the following proportions: asphaltum, six parts; milk of lime, two parts; turpentine, three parts; benzine, five parts; black varnish, two parts; dead-oil, fifteen parts; rubber, one part; burnt umber, three parts; bone-black, five parts; crude petroleum, fifty-eight parts. The crude petroleum, milk of lime, dead-oil, and benzine are first mixed together and thoroughly stirred, when the other ingredients are added, the resultant being a paint compound which will flow readily, yet possess sufficient body for all purposes, and in practice will be found to be very valuable on account of its other characteristics or properties.

Having thus described my invention, what I claim is—

The herein-described paint compound, consisting of asphaltum, milk of lime, crude petroleum, turpentine, benzine, black varnish, dead-oil, rubber, burnt umber, and bone-black, compounded in about the proportions and in the manner substantially as specified.

In testimony that I claim the foregoing as my own I have hereunto affixed my signature in presence of two witnesses.

EDWIN W. GRAFTON.

Witnesses:
    AUGUST PETERSON,
    ARTHUR B. SEIBOLD.